Sept. 6, 1949.                  C. PAGE                      2,481,440
                          EGG GRADING MACHINE
Filed Dec. 27, 1946                                    5 Sheets-Sheet 1
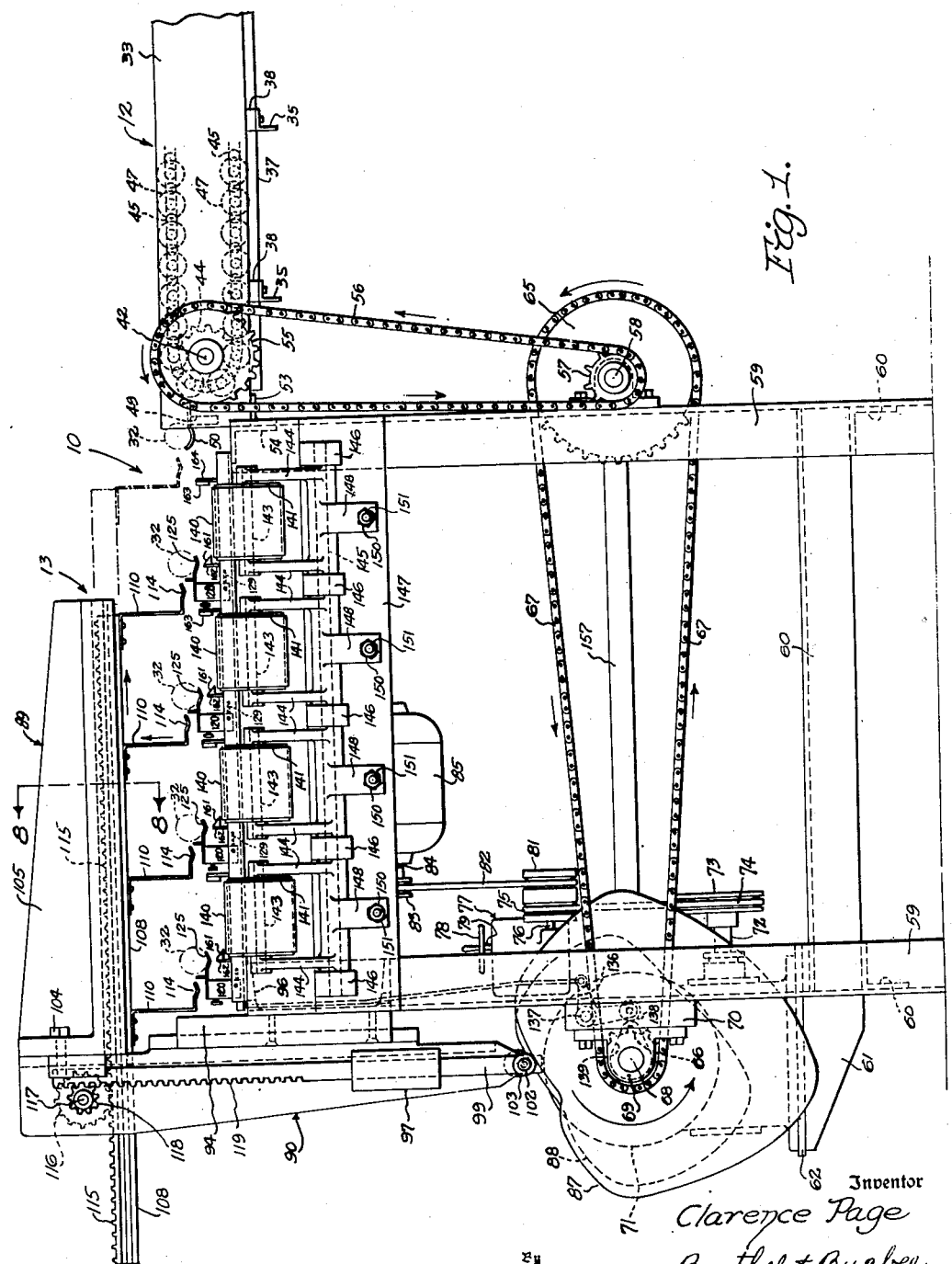
Inventor
Clarence Page
Barthel & Bugbee
Attorneys Sept. 6, 1949.                    C. PAGE                    2,481,440
                             EGG GRADING MACHINE
Filed Dec. 27, 1946                                    5 Sheets-Sheet 2
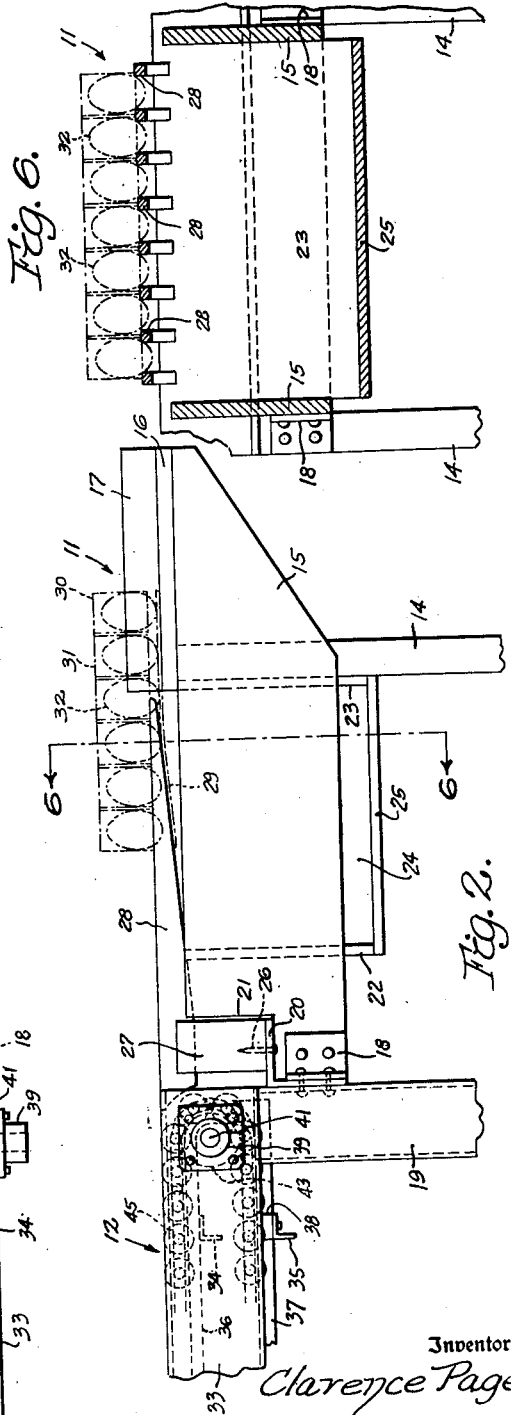
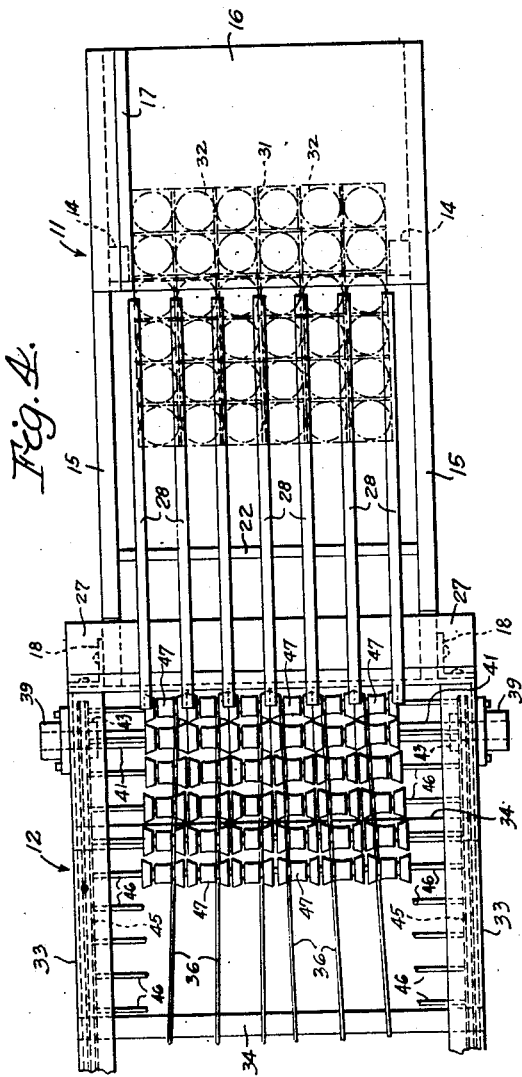
Inventor
Clarence Page
Barthel + Bugbee
Attorneys Sept. 6, 1949.                    C. PAGE                    2,481,440
                              EGG GRADING MACHINE
Filed Dec. 27, 1946                                    5 Sheets-Sheet 3

Inventor
Clarence Page
Barthel + Bugbee
Attorneys

Sept. 6, 1949.
C. PAGE
2,481,440
EGG GRADING MACHINE
Filed Dec. 27, 1946
5 Sheets-Sheet 4
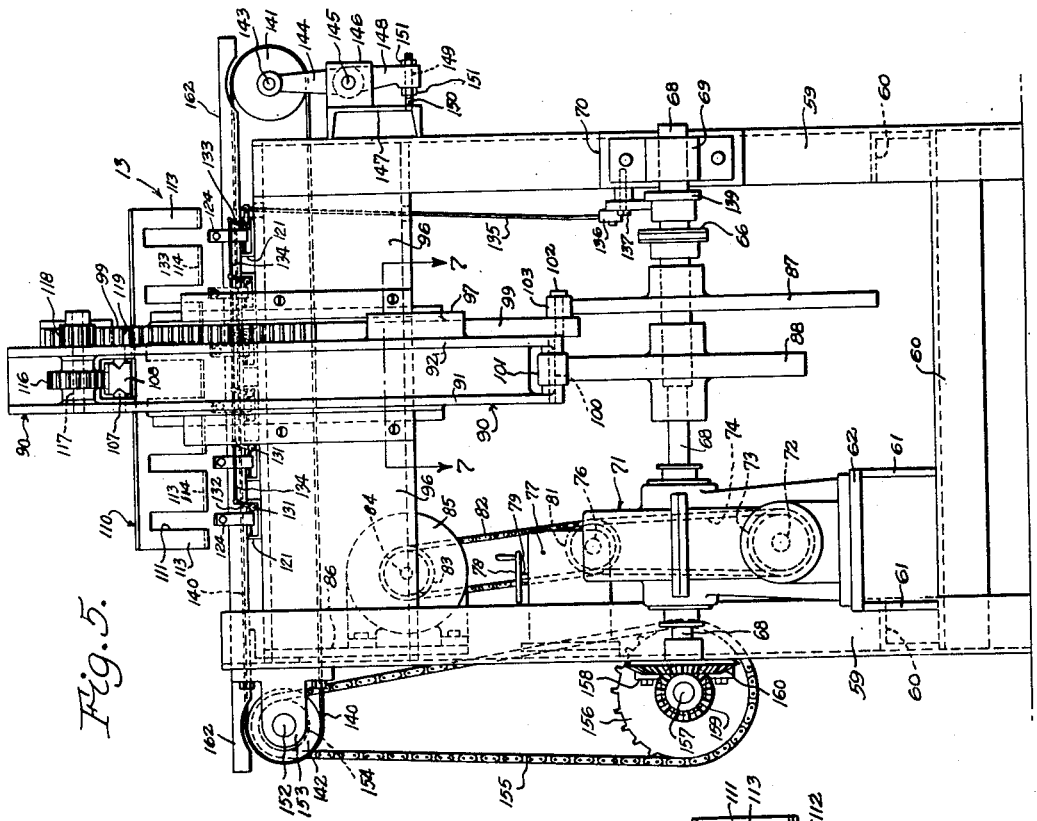
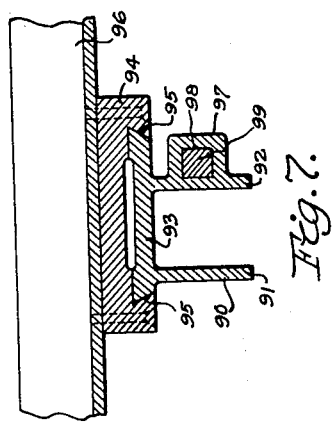
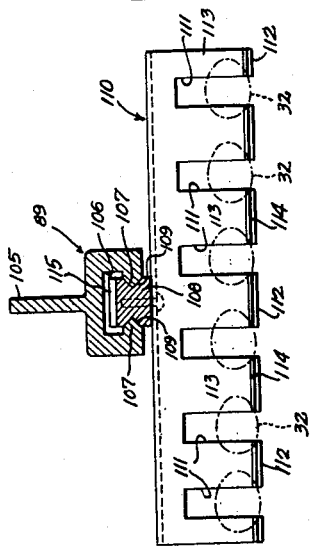
Inventor
Clarence Page
Barthel & Bugbee
Attorneys

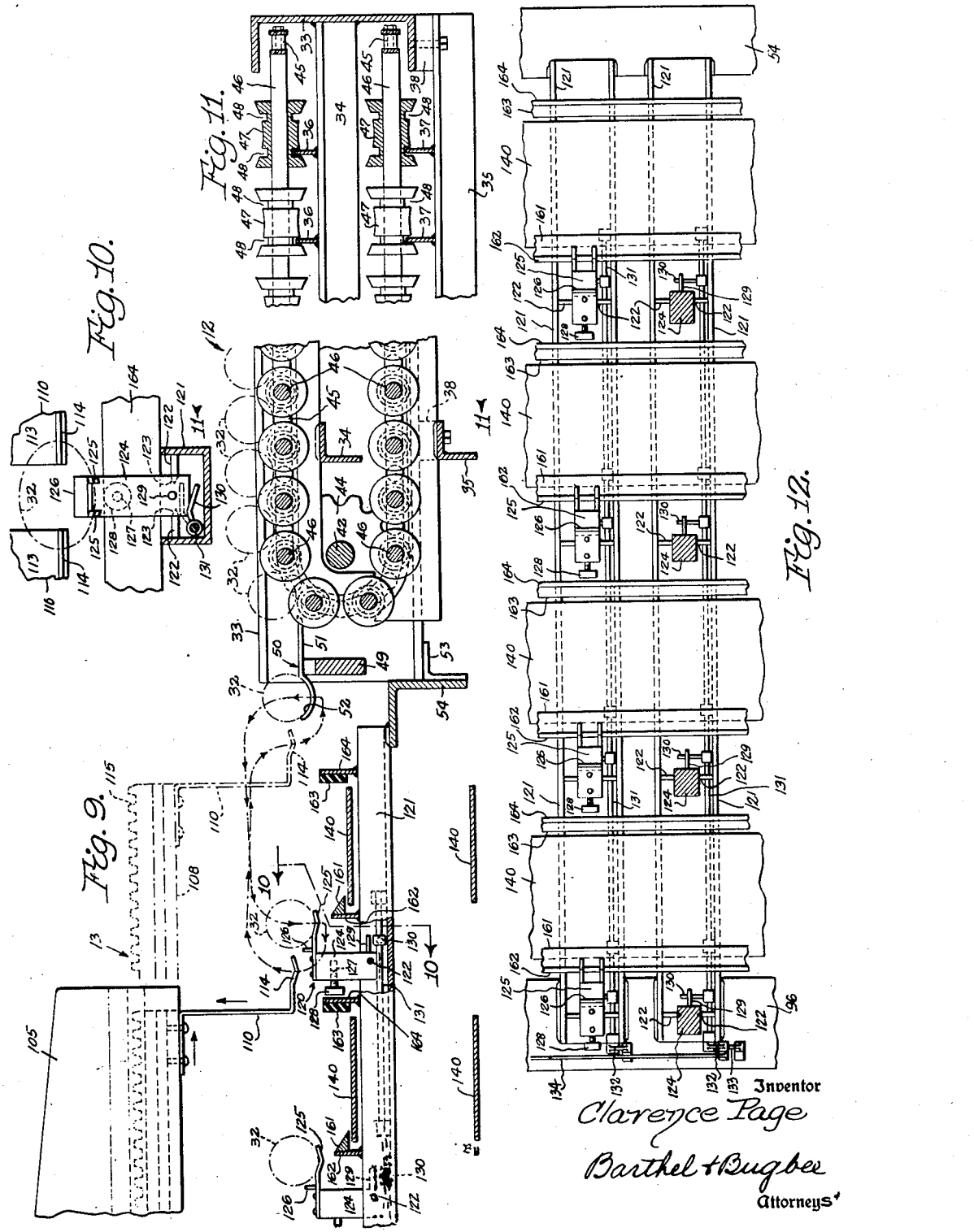

Patented Sept. 6, 1949

2,481,440

UNITED STATES PATENT OFFICE 2,481,440

EGG-GRADING MACHINE

Clarence Page, Detroit, Mich., assignor to Page and Cox, Detroit, Mich., a corporation of Michigan Application December 27, 1946, Serial No. 718,755

5 Claims. (Cl. 209—121)

This invention relates to machinery for grading articles and, in particular, to egg-grading machines.

One object of this invention is to provide an egg-grading machine which will grade eggs according to their weights in a rapid, efficient and accurate manner by automatic mechanism which requires very little attention on the part of the operator.

Another object is to provide an egg-grading machine, as set forth in the preceding object, wherein the eggs need only be deposited upon the machine while in their containers, the machine thereafter automatically separating the eggs from their "fillers" in which they are pocketed and their "flats" which close the bottoms of the fillers.

Another object is to provide an egg-grading machine, as set forth in the preceding objects, wherein the eggs, after separation from their containers, are conveyed automatically to the egg-sorting portion of the machine and turned until their long axes are horizontal while being separated laterally into spaced rows of eggs.

Another object is to provide an egg-grading machine, as set forth in the preceding objects, wherein the thus separated eggs are automatically picked up and conveyed one by one to successive weighing stations at one of which they are selected according to the weight of eggs at which the particular station is set to operate, the egg being conveyed to the next weighing station if it is rejected at a given weighing station.

Another object is to provide an egg-grading machine, as set forth in the preceding objects, wherein the eggs are handled gently but swiftly at all stages, thereby preventing the breakage and consequent soiling occurring in prior machines or manual grading processes in which the eggs underwent treatment sufficiently rough to cause occasional breakage.

Another object is to provide an egg-grading machine, as set forth in the preceding objects, wherein the heavier eggs are sorted out at the first weighing station, the lighter eggs being sorted out at successive weighing stations until all of the eggs have been sorted into predetermined weight ranges.

Another object is to provide an egg-grading machine, as set forth in the preceding objects, wherein an egg which is heavier than the weight for which the particular weighing unit is set will momentarily tilt the weighing unit by an amount which is insufficient to cause the egg to roll off the weighing unit until the weighing unit is released so as to tilt further a sufficient amount to dump the egg upon a suitable receiver, such as a belt conveyor, the releasing being preferably effected automatically by a movable stop mechanism in timed relationship with the operation of the mechanism which carries the egg from one weighing station to another until it is graded out.

Other objects and advantages of the invention will become apparent during the course of the following description of the accompanying drawings, wherein:

Figure 1 is a side elevation of a portion of an egg grading machine according to a preferred form of the present invention, showing the egg-feeding and sorting units thereof;

Figure 2 is a side elevation of the remainder of the egg-grading machine of Figure 1, showing the remainder of the egg-feeding unit.

Figure 4 is a top plan view of the portion of the egg-feeding unit shown in Figure 2;

Figure 5 is a left-hand end elevation of the egg-grading machine shown in Figure 1;

Figure 6 is a vertical cross section through the egg-feeding unit taken along the line 6—6 in Figure 2;

Figure 7 is an enlarged fragmentary horizontal section through the reciprocating mechanism for the egg-carrier of the egg-sorting unit shown in Figures 3 and 5, taken along the line 7—7 in Figure 5;

Figure 8 is a vertical section through the egg carrier of the egg grading unit taken along the line 8—8 in Figure 1;

Figure 9 is an enlarged vertical section through the forward portion of the egg-weighing unit and adjacent portion of the egg-feeding unit taken along the line 9—9 in Figure 3 and showing the cycle of motion performed by the egg carrier;

Figure 10 is an approximately vertical section through a portion of the egg-weighing unit taken along the line 10—10 in Figure 9 and showing details of one of the egg-weighing devices and its stop mechanism;

Figure 11 is a fragmentary vertical section through the egg-feeding unit taken along the line 11—11 in Figure 9; and Figure 12 is an enlarged fragmentary plan view, partly in section, of a portion of the egg-weighing unit of Figure 3, showing certain of the weighing devices and their movable stop mechanism.

Figure 3:
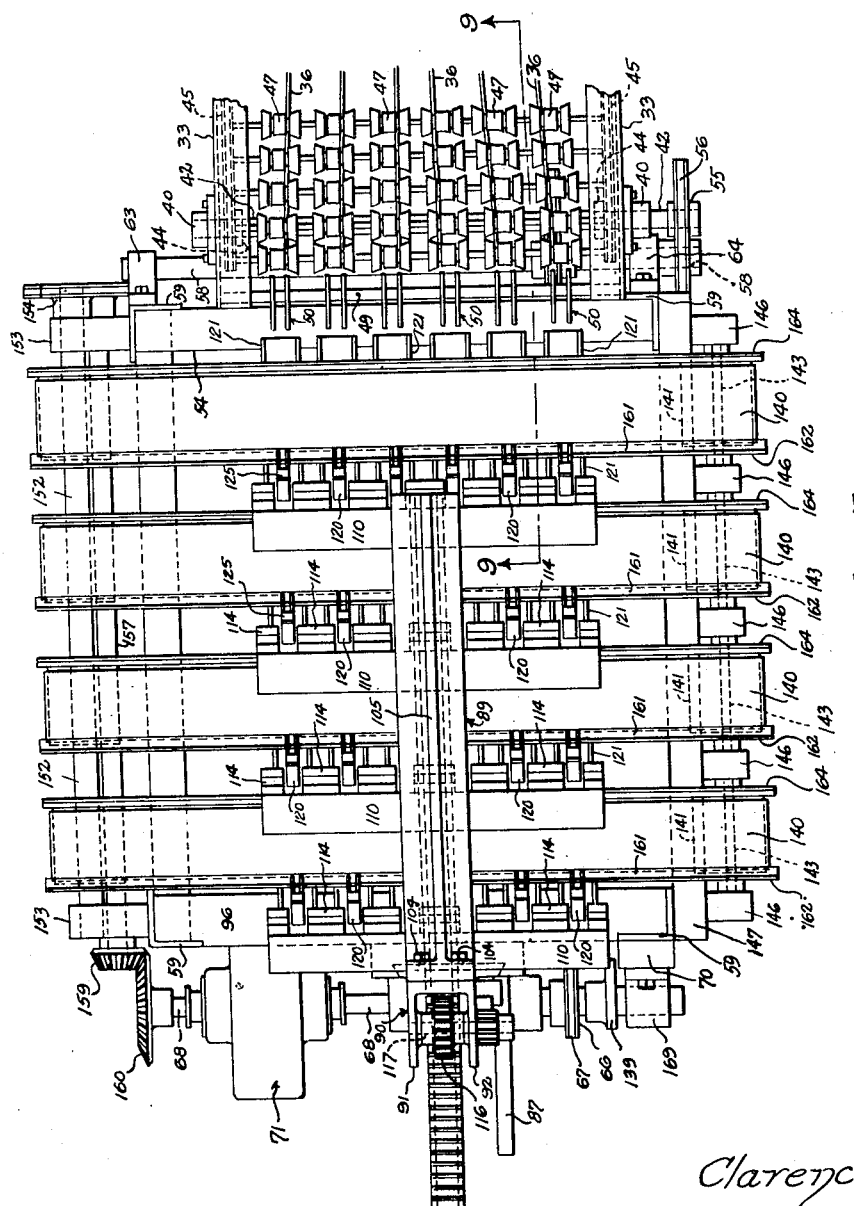
Figure 3 is a top plan view of the portions of the egg-sorting and feeding units of the machine shown in Figure 1.

In general, the egg-grading machine of this invention consists of an egg-feeding unit, generally designated 10, connected to an egg-sorting unit, generally designated 13. The egg-feeding unit 10 includes a container remover portion, generally designated 11 and an egg-separating conveyor portion, generally designated 12. The latter separates the eggs into rows, causes each egg to come to rest with its long axis approximately horizontal, and deposits the eggs on an egg rest. The eggs are automatically picked up from these egg rests by an egg carrier in the egg-sorting unit 13 and are successively deposited upon a series of egg-weighing devices. The egg-weighing devices are adjusted so as to tilt when subjected to different weights of eggs, but to remain untilted if the egg is too light for the setting of the particular weighing device. When one of these devices tilts under the weight of a sufficiently heavy egg, it dumps the egg onto a moving conveyor which conveys it to a collecting place for each grade of eggs according to their range of weight. The egg-feeding unit 10 and egg-sorting unit 13 are described hereinafter in detail.

*Egg-feeding unit*

Referring to the drawings in detail, Figures 1 to 4 inclusive show the container remover portion 11 of the egg-feeding unit 10 as connected to the egg-separating conveyor portion 12 at its extreme left-hand end (Figures 2 and 4). Its right-hand end is supported on legs 14 which are secured to side plates 15 which in turn carry a platform 16 having a guide rail 17 on one side thereof. Bolted to the side plates 15 (Figure 2) are angle brackets 18, these in turn being bolted to legs 19 which support the right-hand end of the egg-separating conveyor portion 12. Mounted between the angle brackets 18 and the legs 19 and secured by the same bolts is an angle member 20 which passes transversely across the receiving unit 11 and passes through cut-away portions 21 in the side plates 15 thereof. Mounted between the side plates 15 are the front and rear walls 22 and 23 respectively of a receptacle 24 having a bottom wall 25.

Rising from the angle member 20 (Figure 2) and secured thereto as at 26 is an upright support 27 upon which are mounted a series of spaced parallel elongated stripping fingers 28, the pointed ends of which are directed toward the platform 16. The fingers 28 are for the purpose of stripping the bottoms or flats 29 from the fillers or pocketed portions 30 of egg containers 31 containing eggs 32. This is accomplished, as more fully described in connection with the operation of the machine, by placing the container 31 containing the eggs 32 upon the platform 16 (Figures 2 and 4) and pushing it to the left, causing the pointed fingers 28 to penetrate the container 31 at the junction of the flat 29 with the filler 30, splitting the two apart. The flat 29 drops into the receptacle 24 while the eggs 32 are slid over the tops of the fingers 28, which are spaced apart an amount slightly less than the small diameter of an undersized egg. When the filler 30, with its bottom or flat 29 thus removed, has been pushed to the left-hand end of the stripping fingers 28, it passes onward to the egg-separating unit 12. At this point, the filler 30 is lifted by the operator, the eggs 32 remaining upon the egg-separating portion 12 while the filler 30 is discarded.

The egg-separating conveyor portion 12, shown partly at the left-hand ends of Figures 2 and 4 and partly at the right-hand ends of Figures 1 and 3, includes a frame formed by a pair of vertical channel members 33 mounted on the upper ends of the legs 19 and with their channel portions facing one another. The channel members 33 are interconnected at intervals by upper and lower angle members 34 and 35 respectively (Figures 9 and 11) which in turn support upper and lower diverging guide rails 36 and 37 respectively. The lower flanges of the channel members 33 are separated from the lower angle members 35 by spacing members 38 (Figure 11).

Bolted to the channel members 33 at their forward and rearward ends are pairs of aligned bearing bushings 39 and 40 respectively (Figures 1 to 4 inclusive) in which are journaled cross-shafts 41 and 42 respectively. Within the channels of the channel members 33 the shafts 41 and 42 near their opposite ends carry sprockets 43 and 44 respectively, these sprockets being encircled by endless chains 45.

Mounted between the endless chains 45 at intervals therealong are rods 46 carrying capstan-shaped rollers or spools 47. The spools 47 are freely rotatable on the rods 46 and slidable axially therealong (Figure 11) and are provided with annular grooves 48 near the ends thereof engageable with guide rails 36 and 37.

The channel members 33 at their left-hand ends are interconnected by a cross member 49 (Figure 9) which serves as a support for egg-rests 50. The egg rests 50 consist of pairs of parallel rods 51 separated by gaps less than the small diameter of an undersized egg and having concavely bent portions 52 at their left-hand ends (Figure 9); their right-hand ends being positioned approximately in line with the groove 48 of the spools 47 at the left-hand end of the egg-separating portion 12. The channel members 33 at their left-hand ends (Figure 9) rest upon an angle member 53 which in turn is secured to an angle member 54 at the right-hand end of the egg-sorting unit 13. The left-hand or rearward shaft 42 carries a second sprocket 55 on the outer end thereof, this in turn being encircled by an endless driving chain 56 which at its lower end encircles a lower sprocket 57 (Figure 1) mounted on a shaft 58.

*Egg-sorting unit*

The egg-sorting unit 13 is supported by legs 59 of angle cross-section interconnected by angle members 60 near their lower ends (Figures 1 and 5). One of the angle members 60 supports a pair of outwardly-extending and overhanging brackets 61 which in turn support a platform 62. Bolted to the legs 59 at the right-hand end of the egg-sorting unit 13 are bearing brackets 63 and 64 in which are journaled the opposite ends of the shaft 58. The shaft 58 also carries a large sprocket 65 (Figure 1) which is drivingly connected to a small sprocket 66 by an endless chain 67. The small sprocket 66 is mounted on a shaft 68, one end of which is journaled in a bearing bracket 69 bolted to one of the legs 59 at the left-hand end of the unit 13 and separated therefrom by a spacing block 70.

The shaft 68 near its opposite end (Figure 5) is connected to a conventional reduction gear box 71 and forms the output shaft thereof. The outer end of the shaft 68 emerges on the opposite side of the gear-box 71. The reduction gear box 71 is of conventional design, and its details form no part of the invention. Its input shaft 72 carries a pulley 73 which is driven by a V-belt 74 from the output pulley 75 on the shaft 76 of a conventional speed varying unit 77. The latter is likewise of conventional design and its details form no part of the invention.

The speed varying unit 77 is controlled by a hand-wheel 78 upon a control shaft 79 and its housing is bolted to one of the legs 59. The speed varying unit 77 is also provided with an input pulley 81 which is driven by a V-belt 82 from a pulley 83 upon the output shaft 84 of an electric motor 85 bolted to a vertical side member or side plate 86. By turning the handwheel 78 the belts 74 and 82 are caused to ride on different diameters of the pulleys 75 and 81, thus varying the speed ratio between them. In this manner, the sprocket shaft 42 of the egg-separating portion 12 is driven from the electric motor 85 through the speed-varying unit 77 and reduction gear box 71.

Also mounted upon the shaft 68 is a pair of cams 87 and 88 (Figures 1 and 5) which actuate an egg-carrier, generally designated 89, and forming a part of the egg-sorting unit 13. The egg-carrier 89 includes a vertically-reciprocable member 90 having parallel flanges 91 and 92 (Figure 7) and a connecting web 93 in the form of a dove-tail slide. The latter is reciprocable vertically in a guide block 94 correspondingly grooved as at 95. The guide block 94 is bolted to a channel member 96 mounted between and interconnecting the side members 86 (Figure 1). The flange 92 (Figure 7) is provided with a boss 97 having a bore 98 of square cross-section in which a square rack shaft 99 is reciprocably mounted.

Journaled on a shaft 100 mounted in the lower end of the vertically-reciprocable member 90 is a roller 101 engaging the edge of the cam 88, which serves to effect vertical reciprocation of the member 90. In a similar manner, the lower end of the rack shaft 99 carries a pin 102 on which is mounted a roller 103 engaging the edge of the cam 87. The latter, in rotating, effects vertical reciprocation of the rack shaft 99. Bolted as at 104 to the top of the vertically reciprocable member 90 is a horizontal member 105 (Figures 1 and 8). The latter is roughly of T-shaped cross-section (Figure 8) and is provided with a horizontal cavity 106 into which extend guide ribs 107 of V-shaped cross-section.

Reciprocably mounted between the guide ribs 107 is a slide 108 having lateral V-grooves 109 for slidably receiving the guide ribs 107. Bolted to the lower side of the slide 108 are approximately Z-shaped egg-holders 110 having spaced slots 111 extending through the lower flanges 112 and webs 113. The lower flange 112 thus slotted, forms bent fingers 114 adapted to receive the eggs 32 when the slots 111 span the egg-rests 50 and the flanges move beneath and then upward past the egg rests 50 as shown by the arrows in Figure 9 and as described in connection with the operation thereof.

The upper side of the slide 108 is provided with rack teeth 115 which mesh with a pinion 116 mounted upon a shaft 117 journaled in the flanges 91 and 92 of the vertically-reciprocable member 90 (Figure 5). The outer end of the shaft 117 carries a pinion 118 which in turn meshes with the teeth 119 on the rack bar 99. As a consequence, when the shaft 68 is rotated by the motor 85, the cam 88 causes the members 90 and 105 to rise and fall and at the same time the cam 87 reciprocates the rack bar 99 to rotate the shaft 118 and cause the slide 108 to move to and fro horizontally. This compound motion causes the fingers 114 to move through the path described by the arrows in Figure 9, lifting the eggs 32 from the egg rests 50, carrying them to the left, and depositing them upon the egg-weighing devices 120 (Figure 9). The latter operate as egg-selectors, sorting out eggs of the weight range for which the particular device is adjusted, and rejecting eggs lighter than this weight range, as described below.

Mounted on top of the egg-sorting unit 13 and extending between the top of the channel member 96 and the angle member 54 (Figures 1, 5, 9 and 12) are spaced upwardly-facing channel members 121 which serve to support the egg-weighing devices 120. The channel members 121 at their right-hand ends are aligned with the egg rests 50 (Figure 3) so that the eggs 32 are conveyed by the egg-carrier 89 to the egg-weighing devices 120 in a direct path. Each channel member 121 is provided with a weighing station having a series of egg-weighing devices 120, four being shown, corresponding to four different grades of eggs selected according to their weights and served by four correspondingly-spaced egg-lifting fingers 114 on the egg holders 110 attached to the slide 108 (Figure 1). The channel members 121 are provided with inwardly extending pivot pins 122 (Figure 10) having pointed ends which engage conical depressions 123 in the opposite sides of vertical blocks 124. Secured to the top of each block 124 is a forwardly projecting egg support 125 which is bent at its forward end to receive the eggs 32. Each egg support 125 is provided with an upstanding portion 126 which forms a stop to prevent the egg from rolling backward. The block 124 is also provided with a threaded horizontal hole 127 for receiving the threaded stem of a counterweight 128. By screwing the counterweight 128 in or out of the hole 127, the block 124 may be caused to tilt when different weights of eggs 32 are placed upon the egg support 125. The egg-weighing devices 120 shown in the first row at the right-hand side of Figure 1 are so adjusted by their counterweights 128 that an unusually heavy egg 32 will tilt the block 124 around its pivot pins 122 and dump the egg, whereas a lighter egg will fail to tilt the block. The egg-weighing devices 120 in the second row, immediately to the left of the first row, are adjusted to tilt with a slightly lighter egg, those in the third row with a still lighter egg, and those in the fourth or extreme left-hand row to tilt with the lightest weight of egg. An egg which is too light to be sorted out by tilting one of the egg-weighing devices 120 in the first row of Figure 1 is automatically transferred to each of the other rows in succession until it tilts one of the devices 120 and is dumped. Thus the egg carrier 89 serves as a transfer device for transferring the eggs successively from one weighing station to another until the egg reaches a station where its weight is sufficient to tilt the device and cause ejection or dumping.

In order to revent premature dumping of the egg, each block 124 is provided with a forwardly extending pin 129 (Figures 9, 10 and 12) which is mounted above a movable stop arm 130 secured to a rod or shaft 131 which extends lengthwise through the channel of each channel member 121. The arm 130 in its raised position (shown in dotted lines in Figure 10) is spaced slightly below the pin 129 so that the block 124 may tilt slightly before the pin 129 engages the movable stop arm 130. The outer end of each rod 131 carries a crank arm 132 (Figures 5 and 12) excepting the extreme right-hand rod 131, which carries a bell-crank lever 133. The crank arms 132 and the vertical arm of the bell-crank 133 are interconnected by a connecting rod 134 so as to rotate all of the rods 131 simultaneously and raise and lower all of the stop arms 130 simultaneously. In order to accomplish this the horizontal arm of the bell crank 133 (Figure 5) is connected to a vertical rod 135, the lower end of which is connected to the horizontal arm of a bell-crank 136 which is pivotally mounted upon the pivot stud 137 which is threaded into the block 70. The vertical arm of the bell-crank 136 (Figure 1) carries a roller 138 which engages the periphery of a cam 139 mounted on the shaft 68 (Figure 5). Consequently, when the shaft 68 rotates, and with it the cam 139, the rods 131 are turned in unison and the stop arm 130 moved upward or downward in unison.

In order to carry away the eggs which are sorted out and dumped at the various weighing stations, each row of weighing devices 120 is provided with an adjacent endless belt conveyor 140 mounted on pulleys 141 and 142 (Figures 1, 3 and 5). The pulleys 141 are mounted upon shafts 143 carried by swinging frames 144 pivotally mounted upon a shaft 145 (Figures 1 and 5) journaled in bearing blocks 146 secured to a channel member 147. The latter is mounted on the side of the machine and welded or otherwise secured to the leg 59 (Figure 5). Each frame 144 is provided with a downwardly projecting arm 148, the end of which is provided with a bore 149. Secured to the channel member 147 and projecting horizontally therefrom are spaced threaded studs 150 which pass through the bores 149 and are provided with lock nuts 151 for locking the arms 148 in any desired positions along the studs 150. Each bore 149 is made sufficiently larger in diameter than the stud 150 to compensate for the arc of swing of the arm 148 and prevent binding of the stud 150 in the bore 149. This adjustment enables the slackness in the belt conveyors 140 to be taken up as desired, and the belt conveyors 140 to be maintained in sufficiently taut condition.

The pulleys 142 which carry the opposite ends of the belt conveyors 140 are keyed to or otherwise drivingly connected to a shaft 152 which is mounted in bearing blocks 153 bolted to the legs 59 at the opposite side of the machine from the pulleys 141. Also mounted upon the shaft 152 is a sprocket 154 which is drivingly connected by a sprocket chain 155 to a sprocket 156 (Figure 5) mounted upon a shaft 157. The shaft 157 is journaled in bearing blocks 158 bolted to the legs 59 (one only being shown). The opposite end of the shaft 157 from the sprocket 156 carries a bevel pinion 159 which meshes with a bevel gear 160 mounted on the rearward end of the shaft 68 at the point where it emerges from the speed-reducing gear box 71. In order to guide the eggs 32 as they are dumped from the weighing devices 120 onto the belt conveyors 140, inclined guides or deflectors 161 are provided extending along one side of each belt conveyor 140 and secured to transverse bars 162 mounted on the channel members 121 (Figure 9). To prevent damage to the eggs as they roll across the belt conveyors 140 after being dumped, buffers 163 are mounted adjacent the opposite edges of the belt conveyors 140 and secured to transverse bars 164 also mounted on the channel members 121.

Operation

In the operation of the egg-grading machine of this invention, the motor 85 is started, causing the various mechanisms to be driven. The eggs in their containers are placed upon the platform 16 of the egg-feeding unit 10 (Figures 2 and 4) and slid toward the egg-sorting conveyor portion 12. Meanwhile, the upper surfaces of the pointed fingers 28 have been waxed so as to reduce friction to a minimum. As the egg containers 31 are slid forward (Figure 2), the ends of the pointed fingers 28 wedge their way between the fillers 20 and their "flats" or bottoms 29, forcing the latter downward and detaching them so that they fall into the receptacle 24 from which they may be removed at intervals.

The bottomless fillers 30 with their eggs 32 are now moved still further forward until the first row of eggs therein is engaged by the rollers 47 on the conveyor rods 46 of the egg-separating conveyor portion 12, which has been set in motion by the operation of the motor 85. The rollers or spools 47 as they move forward along the upper part of the conveyor portion 12 are caused to diverge by the diverging guide rails 36 and at the same time they pull the bottomless fillers 30 forward, until all of the eggs are deposited upon the rollers or spools 47, whereupon the filler 30 may be lifted off and discarded. In most instances it is found that the motion of the spools or rollers 47 causes the filler 30 to ride upward out of engagement with the eggs 32 without the necessity of lifting it.

The eggs thus freed from their fillers 30, are moved along by the conveyor rollers or spools 47 and at the same time are shifted from vertical to horizontal positions. The eggs at the end of the run of the conveyor 12 are deposited by the spools or rollers 47 upon the egg rests 50 with their long axes horizontal and extending transversely of the machine. This action separates the eggs into spaced rows and places them in positions where they are most conveniently carried to and deposited upon the weighing devices 120 of the egg-sorting unit 13.

Meanwhile, the motor 85 by rotating the shaft 68 and the cams 87 and 88, causes the vertical member 90 to rise and fall and also causes the rack bar 99 to rise and fall. This results in a compound motion of the slide 108 and the egg holders 110 connected thereto, the fingers 114 thereof describing the cyclical path shown by the arrows in Figure 9. Starting from the position shown in Figure 9, the finger 114 is carried upward by the upward motion of the vertical member 90 and horizontal member 105 and at the same time it is projected forward as shown in the dotted lines by the horizontal motion of the slide 108 by the rack bar 119 rotating the pinions 116 and 118. Thus, the first holder 110 moves upward and forward into the dotted line position shown in Figure 9, whereupon it descends until the finger 114 passes beneath the egg rest 50. The fingers 114 then pass upward past the egg rest 50, lifting the eggs 32 off these rests and travelling in the return path indicated by the arrows. As the slide 108 moves rearwardly, it is also caused to descend as shown by the arrows, with the fingers 114 passing on opposite sides of the egg supports 125, causing the eggs 32 to be deposited upon the egg-supports 125. The fingers 114 continue to move downward and then move rearward and upward, completing the cycle.

In this manner, a row of eggs is lifted from the egg rests 50 and deposited upon the first row or station of weighing devices 120. The sufficiently heavy eggs of the row overbalance the counterweights 128 and cause the blocks 124 to tilt slightly until their pins 129 engage the movable stop arms 130 (Figure 10). Eggs which are not sufficiently heavy to overbalance the counterweights 128, however, do not tilt the blocks 124 hence these remain vertical. Meanwhile, the rotation of the cam 139 moves the rod 135 upward, so as to rotate the rods 131 and swing the movable stop arms 130 downward (Figure 10). This action permits those weighing devices 120 which have been previously tilted by the eggs to tilt still further and to simultaneously dump their eggs onto the belt conveyor 140 whence they are conveyed to the rearward side of the machine and carried away by other conveying mechanism (not shown) to a candling or inspecting station.

The eggs remaining upon the first row or station of weighing devices 120 which were too light to overbalance the counterweights 128 remain in position on the egg supports 125 and on the second cycle of motion of the slide 108 and fingers 114 are lifted from the first row of weighing devices 120 by the second row of egg holders 110 and are conveyed rearwardly and deposited upon the second row of egg weighing devices 120 (Figure 1) following a cyclical path similar to that described above and shown by the arrows in Figure 9. At the same time, the first row of egg holders 110 and fingers 114 are moving over to the egg rests 50 for the second cycle, in the manner previously described, to convey another row of eggs to the first row of weighing devices 120. The eggs which are sufficiently heavy to tilt the weighing devices 120 in the second row do so and are dumped onto the second belt conveyor 140 and carried away when the movable stop arms 130 are again shifted by the second rotation of the cam 139. In this manner the eggs 32 are successively conveyed from one row or station to another of the weighing devices 120, the eggs sufficiently heavy for the setting of the particular row of weighing devices being dumped at each station and the remainder carried on to the next station to the left of the previous row. At the last station, the weighing devices 120 immediately adjacent the block 94 (Figure 1) are so set that they will dump the eggs of the lightest weights and these are carried away by the final belt conveyor 140. The eggs, thus graded and carried away, are then candled and packed in a manner forming no part of the present invention.

While I have shown and described my invention in detail, it is to be understood that the same is to be limited only by the appended claims, for many changes may be made without departing from the spirit and scope of my invention.

What I claim is:

1. An egg-grading machine comprising a supporting structure having a plurality of spaced egg-weighing stations arranged in succession thereon, an egg-weighing device disposed at each station and including a weighing element responsive to the weights of the eggs in excess of a predetermined weight for ejecting said eggs, a horizontally movable conveyor mounted adjacent each weighing station in the space between successive stations and immediately below the level of said weighing element for carrying away the ejected eggs, an egg transfer device having egg-holders thereon movable between said weighing stations for transferring eggs therebetween, said ejected egg conveyors being mounted for travel transversely to the direction of travel of said egg transfer device, the weighing devices at said stations being constructed and arranged to eject eggs exceeding a different predetermined weight for each station, and power-actuated mechanism operably connected to said egg transfer device and arranged to move said egg holders approximately in inverted U-shaped paths from station to station, said paths including downwardly-directed loop portions extending downwardly to said weighing elements at the corresponding stations and also including substantially horizontal forward and return portions and passing over and extending between the upper ends of said loop portions above said conveyors at a height sufficient for clearance between said egg holders and the ejected eggs traveling transversely on said conveyors.

2. An egg-grading machine comprising a supporting structure having a plurality of spaced egg-weighing stations arranged in succession thereon, an egg-weighing device disposed at each station and including a weighing element responsive to the weights of the eggs in excess of a predetermined weight for ejecting said eggs, a horizontally movable conveyor mounted adjacent each weighing station in the space between successive stations and immediately below the level of said weighing element for carrying away the ejected eggs, an egg transfer device having egg holders thereon movable between said weighing stations for transferring eggs therebetween, said ejected egg conveyors being mounted for travel transversely to the direction of travel of said egg transfer device, the weighing devices at said stations being constructed and arranged to eject eggs exceeding a different predetermined weight for each station, said egg transfer device being arranged to transfer unejected eggs successively from station to station for weight-testing at each station, and power-actuated cam-operated mechanism operably connected to said egg transfer device, said mechanism including a cam configured to move the egg transfer device in an up-and-down direction and a cam configured to move the egg transfer device in a substantially horizontal direction, said cams being arranged to move the egg transfer device and its egg holders approximately in inverted U-shaped paths from station to station, said paths including downwardly-directed loop portions extending downwardly to said weighing elements at corresponding stations and also including substantially horizontal forward and return portions extending between the upper ends of said loop portions and passing over and above said conveyors at a height sufficient for clearance between said egg holders and the ejected eggs traveling transversely on said conveyors.

3. An egg-sorting device comprising a supporting structure having a plurality of egg-weighing stations thereon, a plurality of tiltable egg-weighing devices mounted in succession upon said structure at said stations and responsive to the weights of eggs in excess of a different predetermined weight at each station for ejecting eggs deposited thereon exceeding said predetermined weight for said station, a movable conveyor mounted adjacent each weighing station for carrying away the ejected eggs, said egg-weighing devices having egg supports positioned closely adjacent their respective conveyors, an egg transfer device for transferring the unejected eggs successively from station to station for weight testing at each station, movable stops engageable with said weighing devices for temporarily restraining said weighing devices from tilting to their egg-ejecting positions, each stop in its stopping position being spaced away from its respective weighing device sufficient to permit a preliminary tilting movement of the egg support thereof but insufficient to eject an overweight egg resting upon said egg support, mechanism for actuating said egg transfer device to move said movable stops in timed relationship with said egg transfer device at each weighing station whereby to deposit all eggs which are overweight for the particular station simultaneously on its respective conveyor.

4. An egg-sorting device comprising a supporting structure having a plurality of egg-weighing stations thereon, a plurality of tiltable egg-weighing devices mounted in succession upon said structure at said stations and responsive to the weights of eggs in excess of a different predetermined weight at each station for ejecting eggs deposited thereon exceeding said predetermined weight for said station, a movable conveyor mounted adjacent each weighing station for carrying away the ejected eggs, said egg-weighing devices having egg supports positioned closely adjacent their respective conveyors, an egg transfer device for transferring the unejected eggs successively from station to station for weight testing at each station, movable stops engageable with said weighing devices for temporarily restraining said weighing devices from tilting to their egg-ejecting positions, each stop in its stopping position being spaced away from its respective weighing device sufficient to permit a preliminary tilting movement of the egg support thereof but insufficient to eject an overweight egg resting upon said egg support, cam-operated power-driven mechanism for actuating said egg transfer device to move the eggs from station to station, and mechanism for simultaneously releasing said movable stops in timed relationship with said egg transfer device at each weighing station whereby to deposit all eggs which are overweight for the particular station simultaneously on its respective conveyor.

5. An egg-sorting device comprising a supporting structure having a plurality of egg-weighing stations thereon, a plurality of tiltable egg-weighing devices mounted in succession upon said structure at said stations and responsive to the weights of eggs in excess of a different predetermined weight at each station for ejecting eggs deposited thereon exceeding said predetermined weight for said station, a movable conveyor mounted adjacent each weighing station for carrying away the ejected eggs, said egg-weighing devices having egg supports positioned closely adjacent their respective conveyors, an egg transfer device having egg-holders thereon for transferring the unejected eggs successively from station to station for weight testing at each station, movable stops engageable with said weighing devices for temporarily restraining said weighing devices from tilting to their egg-ejecting positions, each stop in its stopping position being spaced away from its respective weighing device sufficient to permit a preliminary tilting movement of the egg support thereof but insufficient to eject an overweight egg resting upon said egg support, mechanism for actuating said egg transfer device to move the eggs from station to station, and mechanism for simultaneously releasing said movable stops in timed relationship with said egg transfer device at each weighing station whereby to deposit all eggs which are overweight for the particular station simultaneously on its respective conveyor, said egg transfer device actuating mechanism being arranged to move said egg-holders approximately in inverted U-shaped paths from station to station, said paths including downwardly-extending loop portions at the corresponding stations and substantially horizontal forward and return portions joining said loop portions above said station.

CLARENCE PAGE.

REFERENCES CITED

The following references are of record in the file of this patent:

UNITED STATES PATENTS

| Number | Name | Date |
|---|---|---|
| 2,020,511 | McHenry | Nov. 12, 1935 |
| 2,074,383 | Funk | Mar. 23, 1937 |
| 2,246,597 | Niederer | June 24, 1941 |
| 2,296,645 | Marsden | Sept. 22, 1942 |
| 2,305,212 | White | Dec. 15, 1942 |
| 2,381,035 | Campbell | Aug. 7, 1945 |
| 2,410,163 | Howard | Oct. 29, 1946 |